Jan. 2, 1945.   R. A. CARLSON   2,366,594
FRICTION CLUTCH
Filed March 8, 1943   2 Sheets-Sheet 1

Inventor:
Raymond A. Carlson
By: Edward C. Gutzbaugh
Atty.

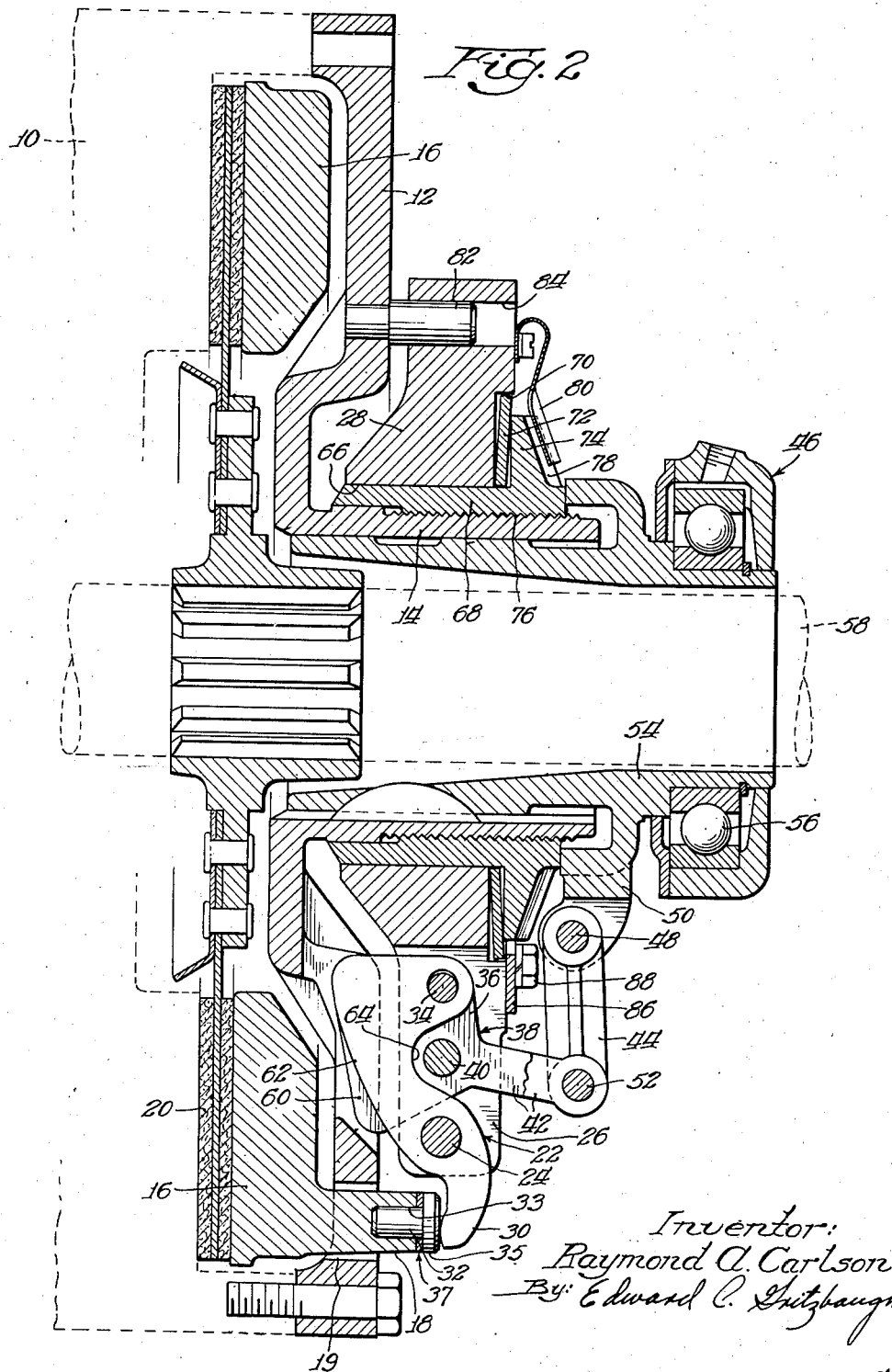

Patented Jan. 2, 1945

2,366,594

UNITED STATES PATENT OFFICE 2,366,594

FRICTION CLUTCH

Raymond A. Carlson, Rockford, Ill., assignor to Borg-Warner Corporation, Chicago, Ill., a corporation of Illinois Application March 8, 1943, Serial No. 478,332

12 Claims. (Cl. 192—68)

This invention relates to friction clutches of the type wherein clutch-engaging pressure comes from a remote operator and is transferred to the pressure plate by means (such as a plurality of levers) which react against the usual fixed reaction member through yieldable reaction means for effecting adjustment of the levers to automatically compensate for a limited amount of facing wear, and in which additional adjustment may be effected, when the facings have worn down beyond that amount, by manually adjustable means which restores the original range of automatic adjustment. A general object of the invention is to provide a clutch of this type having an improved, simplified and compact arrangement of parts. Another object is to provide a clutch of this type in which the manually adjustable means is exposed at the rear of the clutch so as to be accessible for adjustment without necessitating any disassembly of the clutch. A further object is to provide a clutch of this type which, in addition to the advantages mentioned above, incorporates a yieldable reaction member having a negative rate so that the reaction pressure afforded thereby increases rather than decreases as the clutch wears in, and in which the rate is fairly low so as to avoid too great an increase in the amount of pressure required for engaging the clutch.

Another object of the invention is to provide a clutch wherein clutch-operating levers, lever fulcrum ring and reaction spring, adjustable abutment sleeve, and fixed reaction member on which the abutment sleeve is mounted, are arranged in concentric zones that are substantially coextensive axially and encompass one another in the order named so as to achieve maximum compactness.

A further object of the invention is to provide a clutch having in addition to the foregoing features, an overcenter toggle linkage for transferring the clutch-engaging pressure from an axially shiftable operator member at the axis of the clutch to a series of levers, and in which provision is made to limit the overcenter movement at a position which is fixed with reference to the adjustable abutment member and varies in accordance with the adjustment of the latter.

These and other objects and features of this invention will become apparent from the following detailed description when taken together with the accompanying drawings in which:

Fig. 2 is an axial sectional view of the same taken on the line 2—2 of Fig. 1.

Figure 1:
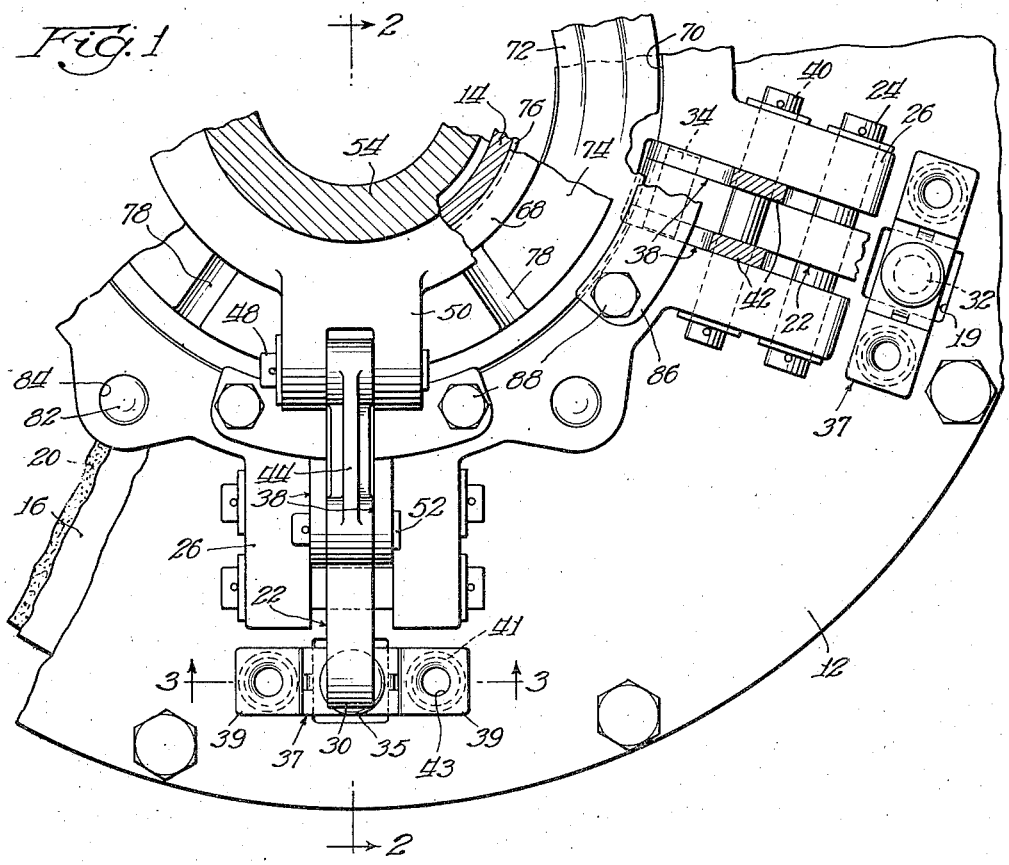
Fig. 1 is a transverse sectional view through a clutch embodying the invention.
Figure 3:
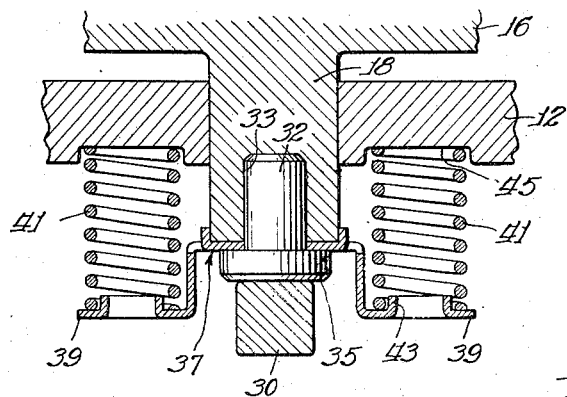
Fig. 3 is a detailed sectional view taken on the line 3—3 of Fig. 1.

As an example of one form in which the invention may be embodied I have shown in the drawings a clutch suitable for use in tractors, in which the engine flywheel, indicated in dotted lines at 10, may form the axially fixed driving member of the clutch. To the flywheel 10 is secured a cover 12 which serves as a cover for other parts of the clutch and which also constitutes a reaction member to take the reactive thrust of the clutch engagement mechanism. For the latter purpose, the cover 12 is provided with a collar portion 14 on which the engagement mechanism is mounted.

An axially movable driving member or pressure plate 16 is mounted between the flywheel 10 and cover 12, and has driving lugs 18 extending through openings 19 in the cover. The driven plate 20 is interposed between the flywheel 10 and pressure plate 16 and adapted to be clamped therebetween for engaging the clutch.

Clutch-engaging pressure is transferred to the pressure plate 16 by a plurality of levers 22 which are fulcrumed on pivot pins 24 mounted between ears 26 on a fulcrum ring 28. The outer arms 30 of the levers 22 engage bearing studs 32 in the ends of the lugs 18. The bearing studs 32 are driven into bores 33 in the lugs 18, and are provided with heads 35 for bearing engagement against the lever arms 30. Confined between the heads 35 and the lugs 18 are yokes 37 each having a pair of arms 39 extending on either side of the respective studs. Between the arms 39 and the cover 12 are compressed coil springs 41 which function to retract the pressure plate. The coil springs are piloted on collars 43 punched into the arms 39 and in the depressions 45 in the cover 12.

The inner ends of the levers 22 are pivoted, as at 34, to the inner ends of the radial arms 36 of bell crank levers 38. The bell crank levers 38 are pivoted as at 40 between the ears 26 and have arms 42 extending generally axially rearwardly. To engage the clutch, the arms 42 are moved outwardly by moving toward the left as viewed in Fig. 2, a plurality of toggle links 44 to, and slightly past, a dead-center position between the arms 42 and an axially shiftable operator member 46. The inner ends of the links 44 are pivoted at 48 upon an outwardly projecting portion 50 of the operator member 46, and the outer ends of the links 44 are pivoted at 52 to the arms 42.

The operator member 46 includes a sleeve portion 54 which is mounted in the collar portion 14 for axially shifting movement. Axial movement is imparted to the operator member 46 through a thrust bearing 56 mounted thereon. The driven shaft 58, indicated in dotted lines, extends freely through the sleeve portion 54 without engaging the same. Thus, the driven shaft may be disassembled while the operator member 46 remains a portion of the clutch assembly which is mounted upon the cover 12.

The radially inwardly extending arms 36 of the bell crank levers 38 are widened axially to form centrifugal weights 60 which assist in the disengagement of the clutch when the links 44 are moved away from their dead-center position. Each lever 22 is embraced by a pair of the levers 38 and the inner arms of the latter, which are connected to the pivots 34, are extended axially as indicated at 62, to form additional centrifugal weight means for the same purpose. The inner arms 62 are provided with recesses 64 to clear the pivot pin 40.

The fulcrum ring 28 has a central bore 66 which receives a bearing sleeve 68 on which the fulcrum ring is axially shiftable. The fulcrum ring 28 has a counterbore 70 in which is received a Belleville washer type reaction spring 72. The sleeve 68 is formed with a radially outwardly extending flange 74 of less radius than the counterbore 70 and adapted to project thereinto as shown. The inner periphery of the spring 72 engages the inner region of the fulcrum ring 28 and the outer region of the spring 72 is adapted to engage the flange 74 at the periphery of the latter so as to transfer the reaction load from the ring 28 to the sleeve 68. The sleeve 68 in turn transfers the reaction load to the collar 14 of the cover 12, being threaded upon the collar 14 as at 76. The spring 72 makes it possible for the pressure plate 16 to make full engagement before lever movement is completed, the remaining lever movement being accommodated by compression of the spring 72 between the fulcrum ring 28 and the flange 74. That is, the entire assembly of levers and fulcrum ring moves rearwardly to permit completion of lever movement after the clutch has become engaged. As the facings wear down, this over-travel of the lever mechanism will gradually decrease until a point is reached where the spring will no longer transfer its load to the lever mechanism to effect full clutch engagement. When this point is reached, the sleeve 68 may be adjusted inwardly with reference to the cover 12, thus moving the entire lever assembly toward the flywheel to compensate for facing wear and restoring the original range of automatic take-up provided by the spring 72. Such manual adjustment is made easy by the exposure of the flange 74 at the rear of the clutch, and may be effected by engaging a suitable tool in one of a series of recesses 78 in the rear side of the flange. The sleeve 68 is normally held against rotation relative to the cover 12 by means of a spring clip 80 carried by the fulcrum ring 28 and engaging one of the recesses 78. The fulcrum ring in turn is secured against rotation relative to the cover 12 by pins 82 mounted in the cover 12 and slidably received in bores 84 in the fulcrum ring 28.

The spring 72 is of a low negative rate variety, and is preloaded to a point wherein its operating range falls within the low negative portion of its deflection curve. The preloading means is quite simple, comprising flat clips 86 of arcuate segmental form secured by screws 88 to the rear face of the fulcrum ring 28 and extending radially inwardly to over-hang the bore 70. Engagement of the periphery of the spring 72 against the overhanging portions of the clips 86 limits the unflexing movement of the spring.

The rearwardly exposed portion of the sleeve 68 serves not only to give ready access to the sleeve for adjusting the same, but also provides a stop against which the projecting portion 50 of the operator member 46 may engage to limit the forward movement of the operator member. Thus, the limit position of over-center movement remains fixed with reference to the corresponding position of the fulcrum ring 28, irrespective of the position of adjustment of the sleeve 68. This feature facilitates embodiment of the over-center principle in a clutch having both the yieldable reaction means and an adjustment in series between the pressure plate and the operator member.

I claim:

1. In a friction clutch, an axially fixed clutch member, a reaction member carried thereby, an axially shiftable clutch member, a plurality of levers for transferring clutch-engaging movement to said shiftable member, a fulcrum ring on which said levers are fulcrumed, adjustment means comprising a sleeve on which said fulcrum ring is axially shiftable, said sleeve being attached to said reaction means for axial adjustment relative thereto, and a reaction spring arranged to transfer the lever reaction from said fulcrum ring to said adjustment means.

2. In a friction clutch, an axially fixed clutch member, reaction means carried thereby including a hub member extending rearwardly, an axially shiftable clutch member, a plurality of levers arranged to transmit clutch engaging pressure to said shiftable member, a fulcrum ring on which said levers are fulcrumed, adjustment means comprising a separate bearing sleeve received within said fulcrum ring and mounting the same for axially shifting movement relative thereto, said sleeve being threaded upon said hub for axial adjustment, and yielding reaction means arranged to transmit the lever reaction from said fulcrum ring to said sleeve.

3. A friction clutch as defined in claim 2, wherein said sleeve is provided with radially outwardly projecting abutment means axially spaced from the inner portion of said fulcrum ring, and wherein said yielding means comprises an annular spring interposed between the inner portion of said fulcrum ring and said abutment means.

4. In a friction clutch, an axially fixed clutch member, an axially shiftable clutch member, means for transferring clutch engaging pressure to said shiftable member, and means for taking the thrust reaction of said last-mentioned means, comprising an axially shiftable ring member, a sleeve on which said ring member is mounted for axially shifting movements, said sleeve having radially outwardly projecting abutment means, an annular spring interposed between said abutment means and said ring member, and reaction means, carried by said axially fixed clutch member, comprising a hub on which said sleeve is mounted for axial adjustment.

5. A friction clutch as defined in claim 4, wherein said abutment means comprises a radial flange, wherein said yielding reaction means comprises a Belleville washer type spring interposed between said flange and said ring member, and wherein said hub, said adjustment sleeve, and said flange, spring and the inner portion of said axially shiftable ring member occupy spaces that are substantially co-extensive axially and are encompassed one within the other in the order named.

6. A friction clutch as defined in claim 4, wherein said abutment means comprises a radial flange, wherein said yielding reaction means comprises a Belleville washer type spring interposed between said flange and said ring member, wherein said hub, said adjustment sleeve, and said flange, spring and the inner portion of said ring member occupy spaces that are substantially coextensive axially and are encompassed one within the other in the order named, and wherein said means for transferring the thrust comprises a plurality of levers arranged radially outwardly of and substantially coextensive axially with said hub, sleeve, and said flange, spring and ring member, said levers being fulcrumed on said ring member.

7. A friction clutch as defined in claim 4, wherein said yielding reaction means comprises a Belleville washer type spring interposed between said abutment means and said ring member, and means for preloading said spring, said last means being secured to said ring member.

8. A friction clutch comprising an axially fixed clutch member, an axially movable clutch member, means for transferring clutch engaging pressure to said movable member, an axially shiftable ring member against which said transferring means react, said ring member having an axially shallow counterbore, a Belleville washer type spring piloted in said counterbore, means secured to said axially shiftable ring member and adapted to preload said spring within said counterbore, and abutment means carried by said fixed clutch member, against which said spring is adapted to react in the engagement of the clutch.

9. In a friction clutch, an axially fixed clutch member, a reaction member carried thereby, an axially movable clutch member, a plurality of levers for transferring clutch engaging pressure to said movable member, a fulcrum ring against which said levers react, said ring having a counterbore, a sleeve on which said ring is axially shiftable, said sleeve having a flange extending radially outwardly adjacent said counterbore to form therewith an axially shallow annular space, a Belleville washer type spring disposed in said annular space, having an inner periphery engaged against said fulcrum ring and its outer region adapted to transfer the lever reaction to said flange, means secured to said fulcrum ring outwardly of said counterbore and overhanging said counterbore to engage the outer periphery of said spring for preloading the same against said fulcrum ring, and a reaction means carried by said fixed clutch member and including a hub on which said sleeve is mounted for axial adjustment.

10. A friction clutch as defined in claim 9, wherein said preloading means comprises flat clips disposed radially outwardly of and in substantially the same radial plane as said flange.

11. In a friction clutch, means defining a rotatable axially fixed clutch member, reaction means carried thereby including an axially rearwardly extending collar, means defining an axially shiftable clutch member, a plurality of levers for transferring clutch engaging pressure to said shiftable member, means defining a reaction member for receiving the reaction of said levers in operating said shiftable member in clutch engaging position, said reaction means including a sleeve rotatably mounted on said collar and disposed radially inwardly of said levers, means defining an axially shiftable operator having a sleeve portion slidably and telescopically mounted within said collar, said operator also having a radially outwardly extending portion, toggle links interposed between said outwardly extending portion of said operator and said pressure transferring levers, said outwardly extending portion being adapted to move said toggle links slightly past dead center and to thereupon engage said sleeve portion so as to hold the parts in clutch engaged position.

12. In a friction clutch, a axially fixed clutch member, a cover member secured thereto, a pressure plate having driving lugs extending through openings in said cover member, headed bearings studs mounted in the ends of said lugs, levers engaging said studs for transferring clutch engaging pressure to the pressure plate, and pressure plate retracting means including yokes, confined between the heads of said studs and said lugs, each yoke having a pair of arms extending on opposite sides of its respective studs, and coil springs compressed between the respective arms and said cover, said studs extending through said yoke members.

RAYMOND A. CARLSON.